(12) United States Patent
Schessel

(10) Patent No.: US 7,184,430 B2
(45) Date of Patent: *Feb. 27, 2007

(54) TELECOMMUNICATION SYSTEM

(75) Inventor: Larry E. Schessel, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 1025 days.

This patent is subject to a terminal disclaimer.

(21) Appl. No.: 10/172,434

(22) Filed: Jun. 14, 2002

(65) Prior Publication Data

US 2005/0089018 A1  Apr. 28, 2005

Related U.S. Application Data

(63) Continuation of application No. 08/934,250, filed on Sep. 19, 1997, now abandoned.

(51) Int. Cl.
H04L 12/66 (2006.01)

(52) U.S. Cl. .................. 370/352; 370/354; 370/466

(58) Field of Classification Search ............... 370/354, 370/352, 353, 465, 466, 410, 401, 522; 379/201.1, 379/207.05, 209.01, 210.02
See application file for complete search history.

(56) References Cited

U.S. PATENT DOCUMENTS 6,125,113 A * 9/2000 Farris et al. ............... 370/389
6,236,653 B1 * 5/2001 Dalton et al. .............. 370/352

* cited by examiner

Primary Examiner—Chi Pham
Assistant Examiner—Alexander O. Boakye

(57) ABSTRACT

A telecommunication system for enabling a subscriber to calling features available by a central office to have access to such calling features when such subscriber is accessing the central office through either a line connected to the central office or an Internet, Intranet, Extranet (i.e., IP) network which uses the TCP/IP network protocol. The method includes the steps of: processing signals received by the central office from the subscriber through either the IP network or the line connected to the central office to determine whether the subscriber is placing a call to the central office through either the line to the central or through the IP network; and making such calling features available to the subscriber independent of whether the subscriber is connected to the central office through the line to the central office or through the IP network. With such a system, calling feature provided at a central office are available to a subscriber to such calling features anywhere ion the world via the IP network.

13 Claims, 9 Drawing Sheets

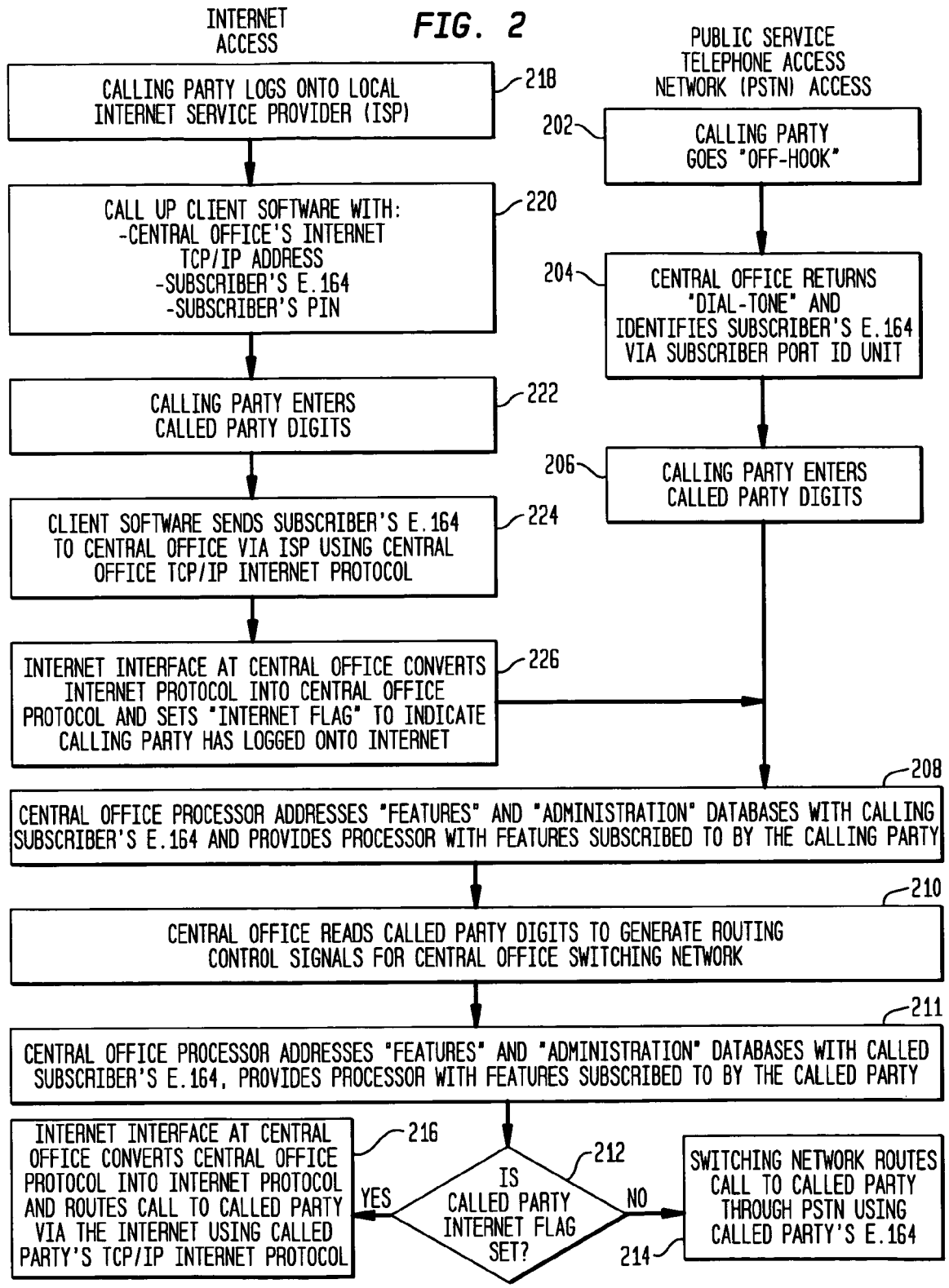

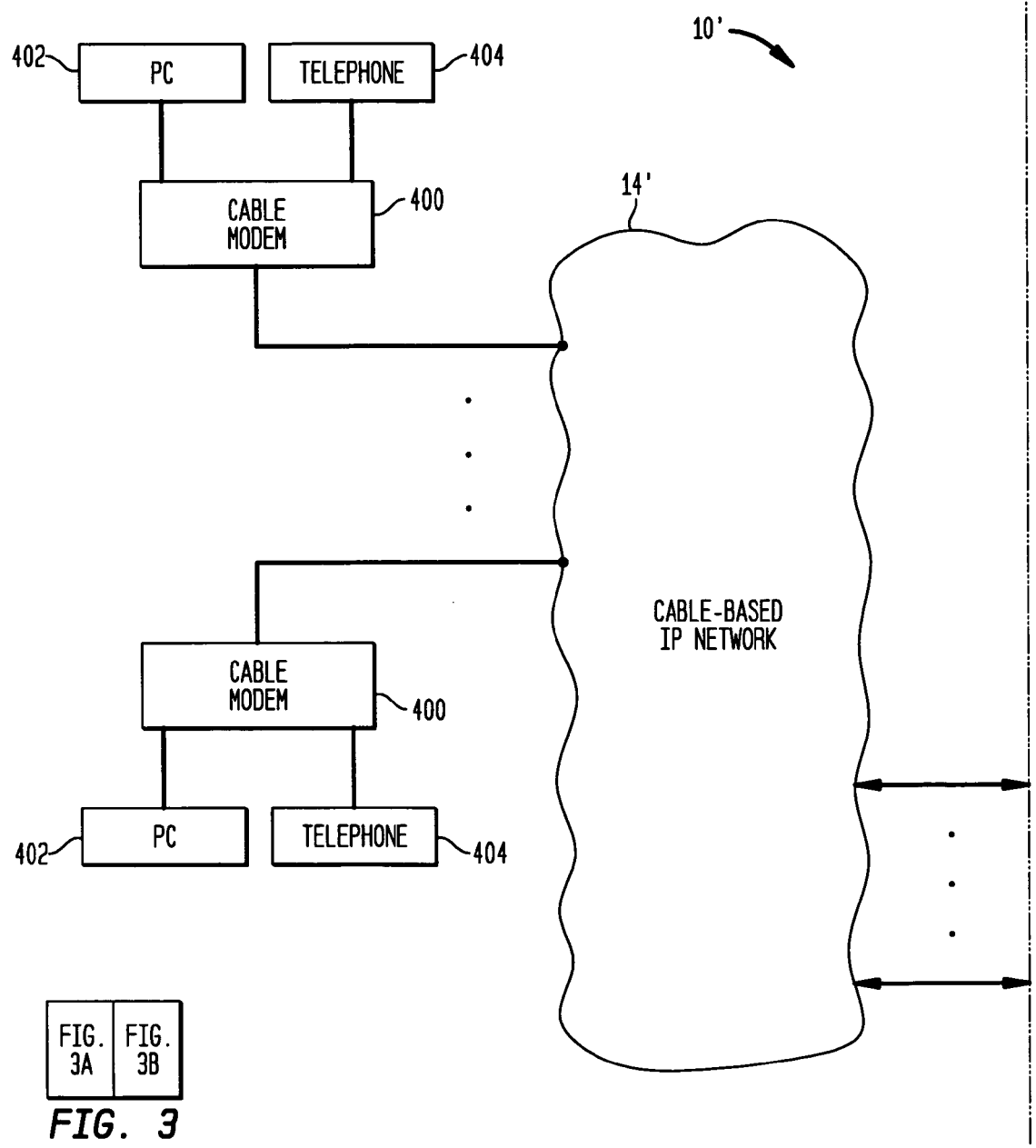

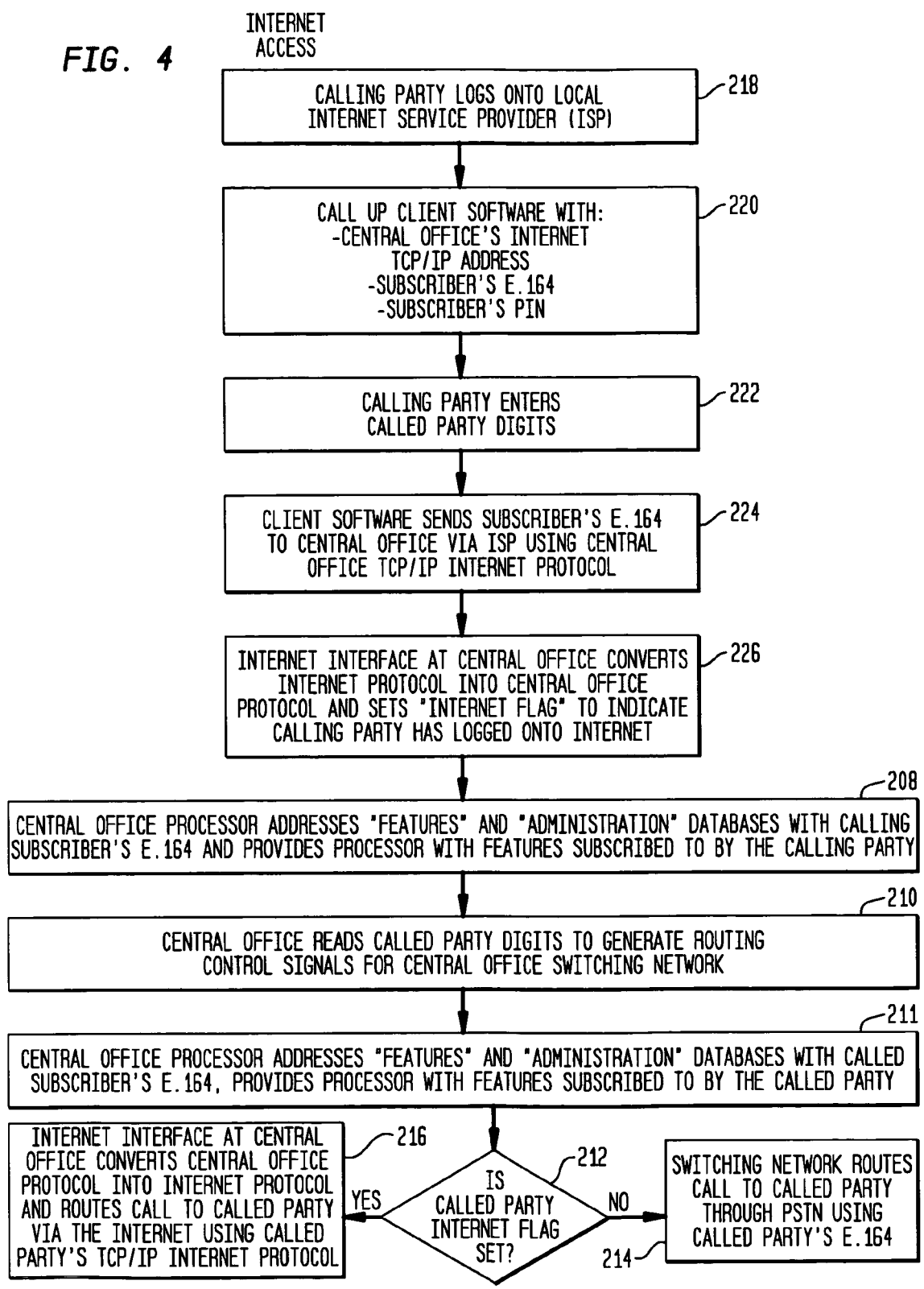

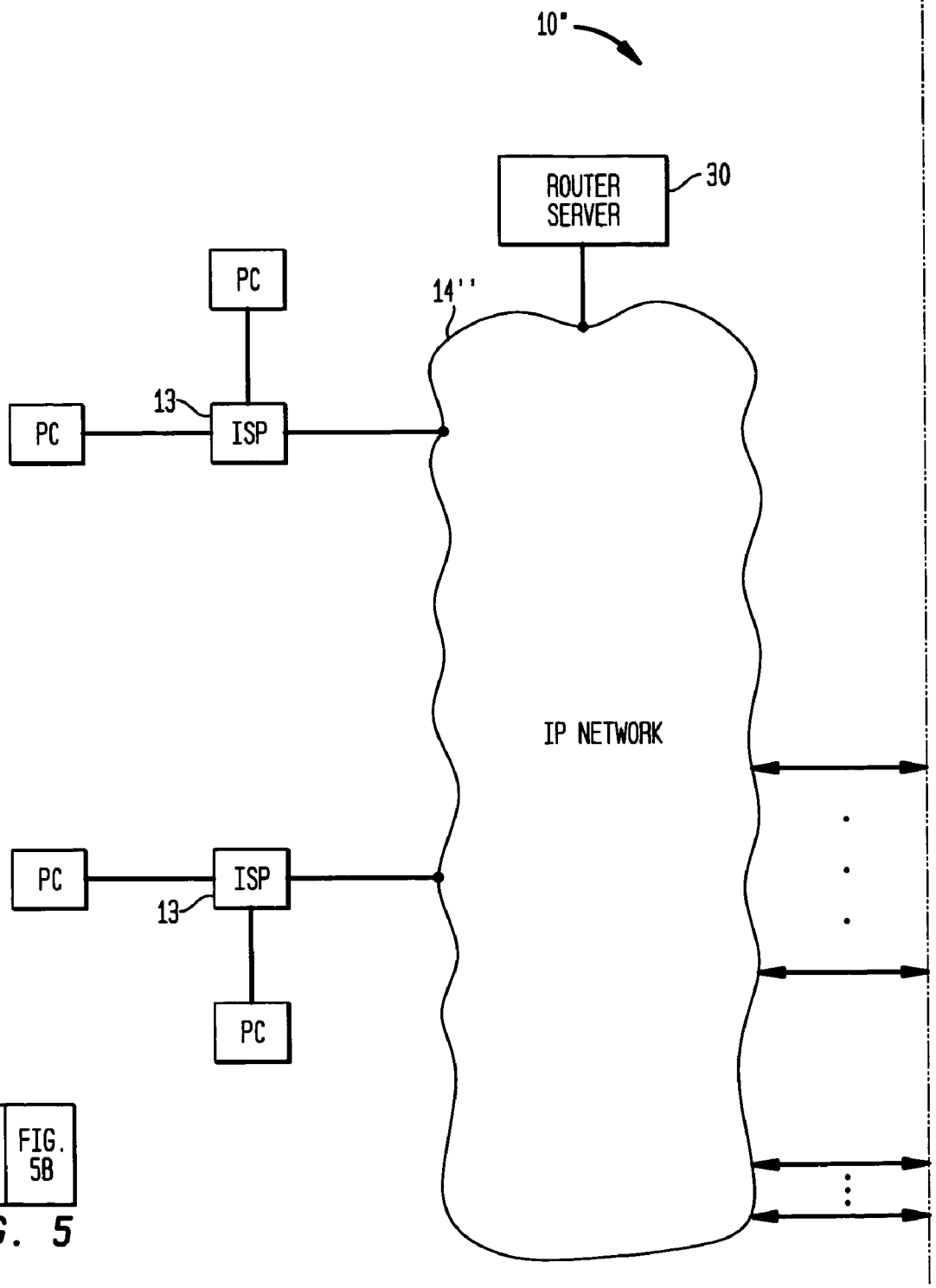

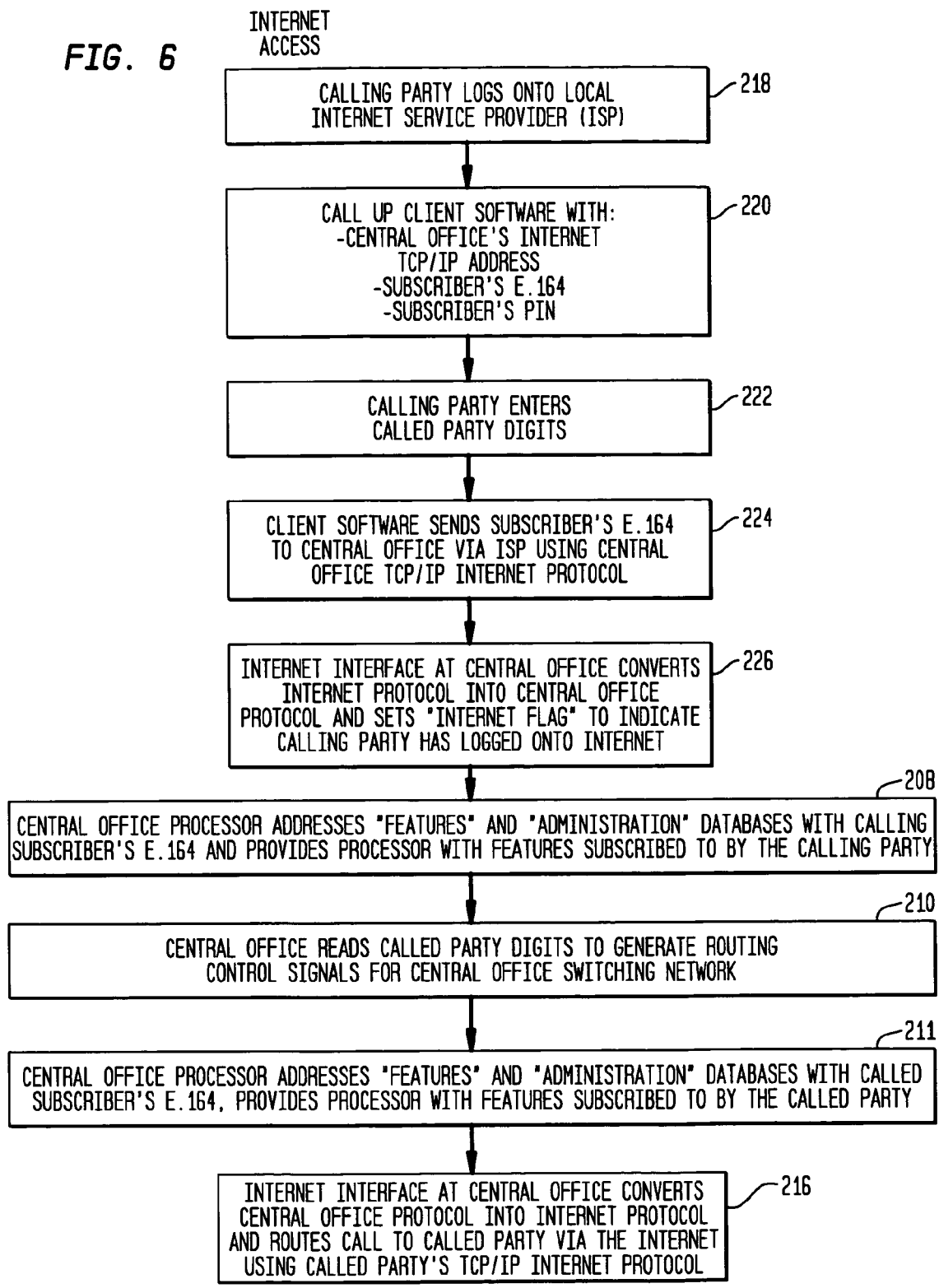

TELECOMMUNICATION SYSTEM

This is a continuation, of application Ser. No. 08/934,250 filed Jun. 30, 1997 now abandoned.

BACKGROUND OF THE INVENTION

This invention relates generally to telecommunication systems and more particularly to telecommunication systems adapted for used with Internet, Intranet, Extranet TCP/IP network protocol.

As is known in the art, Internet, Intranet, Extranet networks (referred to herein as IP networks) have supplemented public service telephone networks (PSTNs) in providing telephony services. For example, client software is available for enabling an Internet subscriber to place calls to a called party through the Internet. Typically, the calling party accesses the Internet via an Internet Service Provider (ISP) through either a modem or a local area network (LAN) router. Data is transmitted from the calling party's ISP through the Internet using an Internet protocol, typically the Transmission Control Protocol (TCP) and the Internet Protocol (IP) commonly referred to collectively as TCP/IP. This TCP/IP protocol is also used for Intranets/Extranets serving a specific closed group of subscribers/users. Thus, the term IP network will be used to include any network using the TCP/IP network protocol. The routing of information through an IP network is based on TCP/IP addressing. A TCP/IP address is 32 bits long and is commonly expressed as four decimal numbers ranging from 0 to 256, with each number separated by a dot.

As is also known in the art, when accessing the ISP with a modem, the ISP makes available a modem in a modem pool in what is sometimes referred to as a "point-to-point" protocol. When accessing the ISP with a direct leased line, as from a LAN or cable company (CATV), data packets transfer between the LAN or cable and the IP network directly as IP packets of information. The routing through the IP network is, as noted above, using the TCP/IP network protocol with each point on the IP network having a TCP/IP address. A router server is coupled to the IP network to convert between an E.164 telephone number (i.e., using a central office addressing protocol) and TCP/IP address (i.e., the IP TCP/IP network addressing protocol). Thus, for example, if a cable-based IP user wishes to call a called party on the PSTN network, the calling party dials the called party's E.164 directory number, the router server converts the dialed number to an TCP/IP number, the call is routed through the cable-based IP network to the TCP/IP address of an ISP gateway which then converts the TCP/IP address to the called party's E.164 directory telephone number and directs the call through the central office on one of the lines (i.e., a trunk line) into the central office.

As is also known in the art, a variety of services, or features, are available to subscribers of the PSTNs. For residential PSTN subscribers, these features include: Plain Old Telephone Service (POTS); custom calling features (such as, call waiting, call forwarding, three-way calling, and speed calling, for example); advanced calling features (such as, called ID); Advanced Services for Display-Based Telephone Sets (ADSI); Digital Voice and Data on One Line (ISDN); Voice-Activated Services; Operator Services; and Voice Mail. For business PSTN subscribers, these feature include: ISDN Line-Level Interface (BRI); ISDN High-Bandwidth Trunk Interface (PRI); Centrex Business Telephone Groups; Automatic Call Distribution (ACD); Frame Relay Data Transmission; Videoconferencing; and Dialable Wideband Services/Bandwidth on Demand. A list of the features subscribed to are stored in a "features" database at the central office connected to the PSTN subscriber (i.e., the subscriber's central office, end office, or local switch). Thus, when a calling party goes "off-hook", the central office returns a dial-tone and then the calling party enters a called party's digits. A processor at the central office addresses the "features" database (and an administration database, for billing, etc.) using the calling party's telephone number, known as the calling party's E.164. The central office processor reads the called digits and provides switching signals to a central office switching network to route the call to the called party with the calling party having available the subscribed features stored in the "features" database. It is noted that the central office communicates internally and with other central offices in the PSTN with protocols (i.e., protocols adapted for use with analog (POTS), ISDN, and PBX, for example) which are different from the TCP/IP network protocol.

SUMMARY OF THE INVENTION

In accordance with the present invention, a method is provided for enabling a subscriber to calling features available by a central office to have access to such calling features when such subscriber is accessing the central office through either a line connected to the central office or an IP network. The method includes the steps of: processing signals received by the central office from the subscriber through either the IP network or the line connected to the central office to determine whether the subscriber is placing a call to the central office through either the line to the central or through the IP network; and making such calling features available to the subscriber independent of whether the subscriber is connected to the central office through the line to the central office or through the IP network.

With such an arrangement, calling feature provided at a central office are available to a subscriber to such calling features anywhere in the world via an IP network.

In accordance with another feature of the invention, the central office includes a database for storing a relationship between each one of the subscribers served by the central office and calling features subscribed to such one of the served subscribers. A processor in the central office detects when a calling one of the subscribers served by the central office is accessing the central office from either the subscriber line unit or an IP network interface. The processor addresses the database using the central office protocol and provides the calling subscriber with the subscribed calling features when routed to a called party.

In accordance with still another feature of the invention, the central office includes an IP network interface for converting between a central office protocol and an IP protocol. A processor at the central office is coupled to the IP network through the IP network interface. A switching network in the central office has ports fed by a subscriber line unit, trunk units, and the IP network interface. The switching network routes calls between the ports selectively in accordance with switching signals provided by the processor using the central office protocol with the calling party having available calling features subscribed to by the calling subscriber.

In accordance with another feature of the invention, a telecommunication system adapted for use with an IP network is provided. The system includes a public service telephone network comprising a plurality of connected central offices each one being connected to a plurality of subscribers serviced by the central office. At least one of the central offices comprises a processor coupled to: a subscribe line unit servicing the subscribers served by the central office; trunk units coupled to other ones of the central offices; and an IP network interface. The IP network interface converts between a central office protocol and an IP protocol. The processor is coupled to the IP network through the IP network interface. A switching network is provided having ports fed by the subscriber line unit, the trunk units, and the IP network interface. The switching network routes calls between the ports selectively in accordance with switching signals provided by the processor using the central office protocol. A database is provided for storing a relationship between each one of the subscribers served by the central office and features subscribed to by such one of the served subscribers. The processor detects when a calling one of the subscribers served by the central office is accessing the central office from either the subscriber line unit or the IP network interface and addresses the database with the central office protocol to provide such calling subscriber with calling subscribed features when the calling subscriber is routed to a called party through the switching network.

BRIEF DESCRIPTION OF THE DRAWINGS

For a better understanding of the invention, reference is made to the following description of an exemplary embodiment thereof, and to the accompanying drawings, wherein:

FIG. 2 is a flow diagram showing steps used by the telecommunication system of FIG. 1 in enabling a subscriber to calling features available by a central office of the system to have access to such calling features when such subscriber is accessing the central office through either a line connected to the central office or an IP network;

FIG. 4 is a flow diagram showing steps used by the telecommunication system of FIG. 3 in enabling a subscriber to calling features available by a cable company's central office of the system to have access to such calling features when such subscriber is accessing the central office through a cable based IP network;

FIG. 6 is a flow diagram showing steps used by the telecommunication system of FIG. 5.

DESCRIPTION OF THE PREFERRED EMBODIMENTS

Figures 1, 1A:
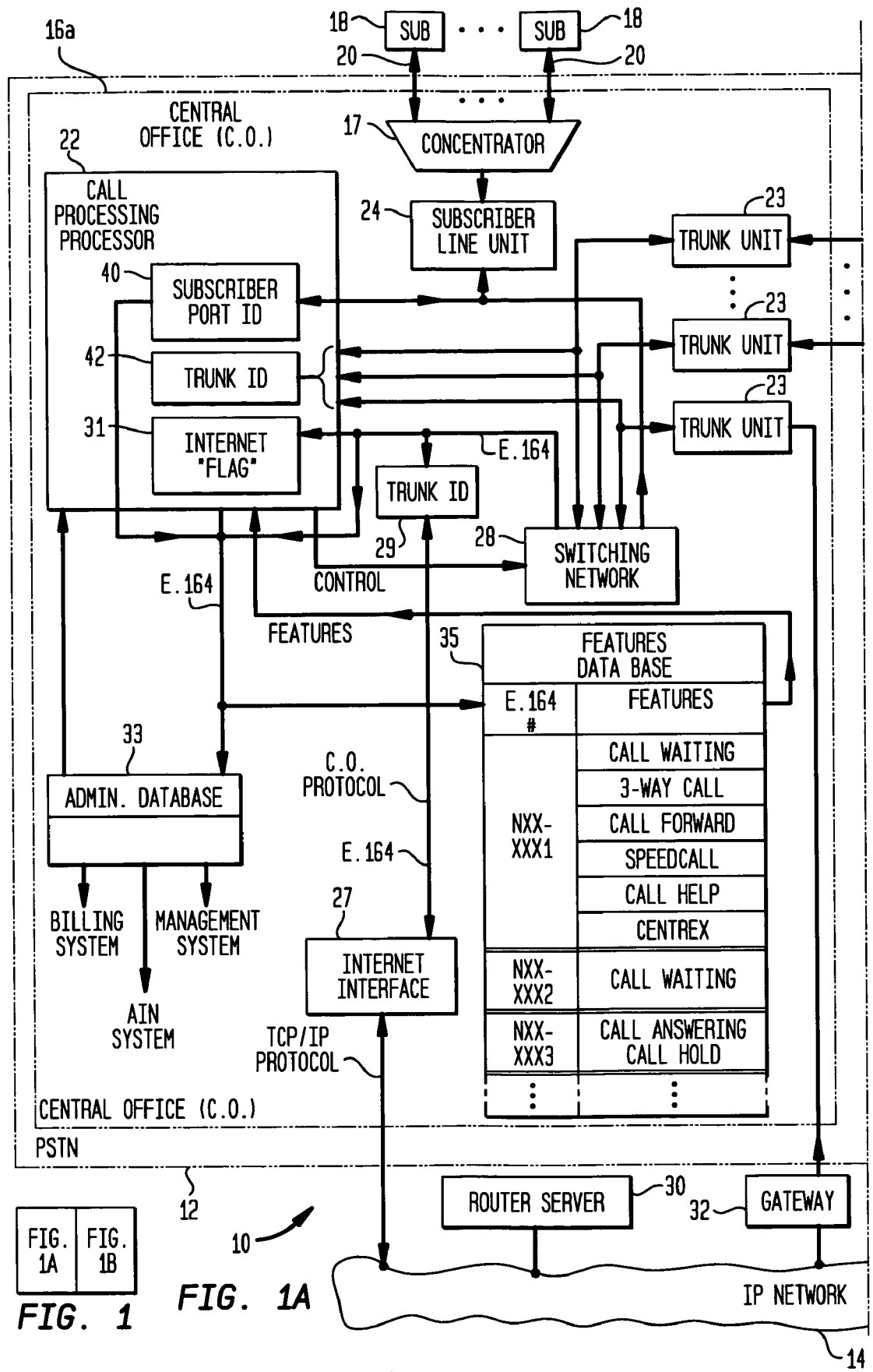
FIG. 1 is a block diagram of a telecommunication system according to the invention.
Figure 1B:
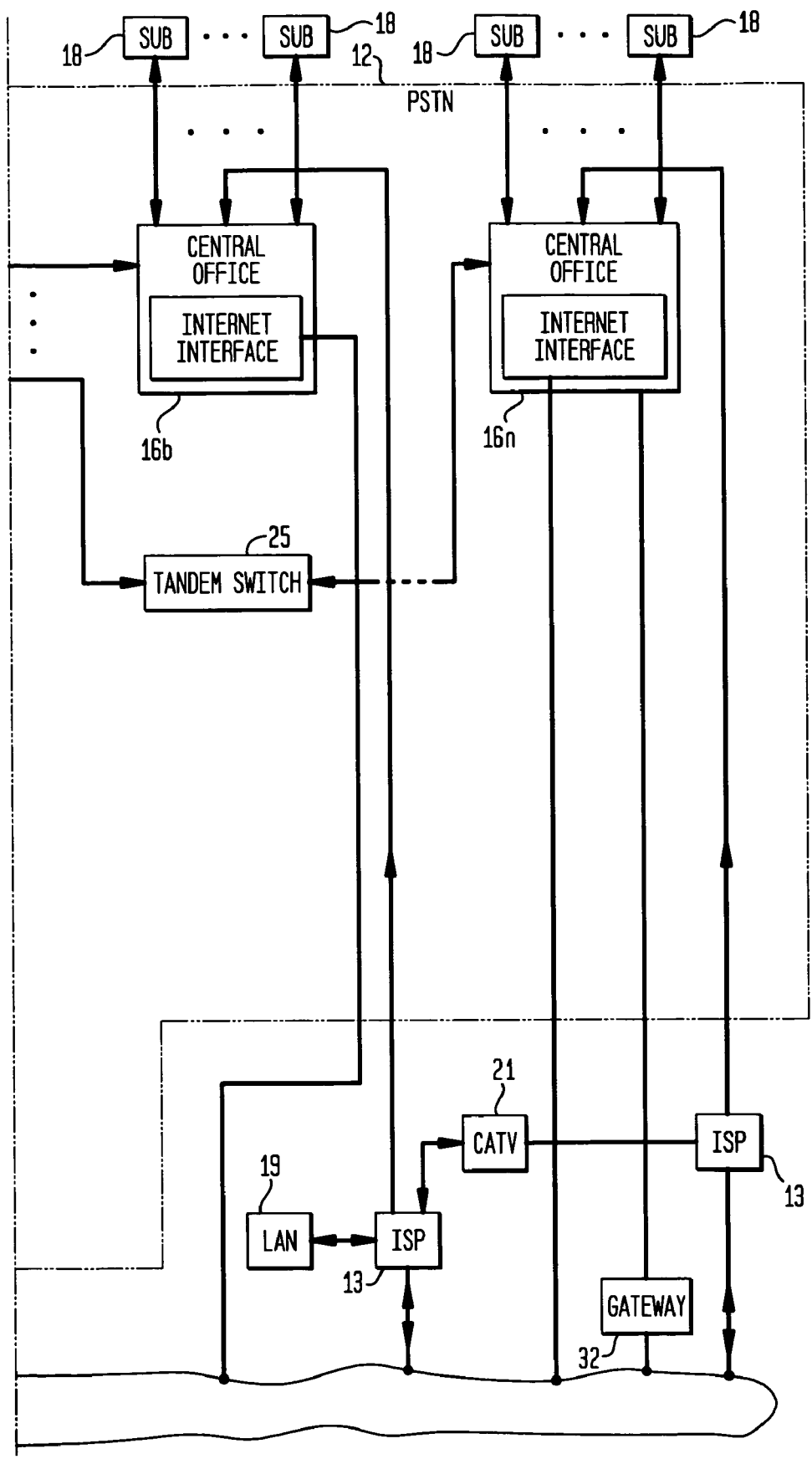

Referring now to FIG. 1, a telecommunication system 10 is shown to include a public service telephone network (PSTN) 12 and an IP network 14. The services of the IP network 14 are provided by IP network Service Providers (ISPs) 13. These ISPs 13 are accessed by personal computer (PC) connected modems, not shown, at PSTN subscriber's business, home, hotel room, airport, for example, or by dedicated leased lines from LANs 19. It should also be noted that the ISPs 13 are also connected to cable companies (CATV) 21 to enable direct, non-modem, connections into the IP network 14 from a PC or digital telephone. Each of the ISPs 13 has a unique TCP/IP address to enable their interconnection through the IP network 14. When accessing the ISP 13 with a modem, the ISP 13 makes available a modem in a modem pool using a "point-to-point" protocol. When accessing the ISP 13 with a direct leased line, as from a LAN 19 or cable company (CATV) 21, data packets transfer between the LAN 19, or cable company 21, and the IP network 14 directly as IP packets of information. In each case, the routing through the IP network 14 is with the TCP/IP network protocol with each point on the IP network 14 having a TCP/IP address. It is noted that a router server 30 is coupled to the IP network 14 to convert between an E.164 telephone number and TCP/IP address. Thus, for example, if a cable user wishes to call a called party on the cable system, the calling party dials the called party's E.164 directory number, the router server 30 converts the dialled number to an TCP/IP number, the call is routed through the IP network 14 to the TCP/IP address of a gateway 32, which then converts the TCP/IP address to the called party's E.164 directory telephone number. The output of the gateway 32 is connected to the PSTN 12.

The PSTN 12 includes a plurality of connected central offices (C.O.s) 16a, 16b, . . . 16n. Each one of the central offices 16a–16n is similar, an exemplary one thereof, here central office 16a being shown in detail. Thus, central office 16a is connected to a plurality of the PSTN subscribers 18 through subscriber/central office telephone lines 20 (i.e. a twisted-pair typically within two miles of the central office 16a). The PTSN subscribers 18 include business and residential subscribers to the PSTN 12. Thus, for example, if one of the residential subscriber 18 may have in addition to a telephone, a personnel computer (PC) connected to the subscribers telephone line 20 through a modem, not shown. A business subscriber 18 may be connected to the central office 16a through POTS, PBX, or ISDN service, for example. The central offices 16a–16n are shown interconnected by trunks lines (i.e., units) 23. One of the trunk lines 23 is connected to a gateway 32. Some of the central offices, such as office 16b, are connected directly to central office 16a by a trunk and other, more remote central offices, such as central office 16n, are connected indirectly to central office 18a through tandem switches 25, as shown. It should be understood that the PSTN 12 is here a worldwide network and interconnections among the central offices 16a–16n include satellite links or optical fiber cable (SONET), for example. Further, the interconnection may be through virtual circuits, as when links in the network 12 use packet switches, such as ATM switches.

Referring to exemplary central office 16a, such office 16a includes: a processor 22 coupled to a plurality of subscribers 18 through a concentrator 17 and a subscribe line unit 24; trunk units 23 coupled to other ones of the central offices 16b–16n, as shown; an IP network interface 27 for converting between a central office protocol and an TCP/IP network protocol; a switching network 28; an administration database 33; and a features database 35, as shown. The processor 22 is coupled to the IP network 14 through a trunk unit 29 and the IP network interface 27, as shown.

The switching network 28 has ports fed by the subscriber line unit 24, the trunk units 23, the trunk unit 29, and the IP network interface 27. The switching network 28 routes calls between the ports of the switching network 28 selectively in accordance with switching signals provided by the processor 22 in accordance with the central office protocol. The administrative database 33 is addressable by a calling party E.164 address and stores billing information and other statistical information. The features database 35 stores a relationship between each one of the PTSN subscribers 18 served by the central office 16a and features subscribed to by such one of the served PTSN subscribers 18. These features, herein collectively referred to as calling features, include, for example: call waiting, call forwarding, three-way calling, speed calling, caller ID, voice mail, and Centrex Business Telephone Groups.

As noted in FIG. 1, the features database is addressed using the central office protocol which uses an E.164 number to identify the calling party's telephone number. Thus, for example, the PTSN subscriber 18 calling from telephone number NXX-XXX1 has, in this example, subscribed to call waiting, 3-way calling, call forwarding, call hold and is a member of a centrex group.

The processor 22 includes a subscriber port ID unit 40 for identifying the calling subscriber's directory number (i.e., an E.164 number protocol). The processor 22 also includes a trunk ID unit 42 fed by the trunk units 23 for identifying a calling party's or a called party's E.164 directory number. The processor 22 is also fed the E.164 number produced by the IP network interface 27 when a call is received by a subscriber to the central office 16*a* through the IP network 14. This may be where the PTSN subscriber 18 is on a trip and logged into an ISP 13 serving central office 16*n*, for example. The processor 22 includes an IP network "Flag" 31 which is set when the calling PTSN subscriber 18 is accessing the central office 16*a* through the IP network 14 (i.e, through the IP network interface 27).

The processor 22 detects when a calling one of the subscribers 18 served by the central office 12 is accessing the central office 12 from either the subscriber line unit 40 or the IP network interface 27. The processor 22 addresses the features database 35 and the administrative database 33 using the central office protocol (e.g. analog, ISDN, or PBX) to provide such calling PTSN subscriber 18 with his/her subscribed calling features.

Referring now to FIG. 2, two scenarios are depicted: the one on the left is when a calling party is accessing the central office 16*a* through the IP network via the IP network interface 27; and the one on the right depicts the scenario when a calling party is accessing the central office 16*a* through the subscriber line unit 24 or the trunk lines 23 (i.e., through the PSTN 12). Thus, when a call is placed to the central office 16*a* through the PSTN 12, the calling party goes "off-hook" (Step 202). The central office 16*a* returns "dial-tone" and identifies subscriber's E.164 via subscriber port ID unit 40 (Step 204). The calling party enters the called party digits (Step 206). The central office processor 22 addresses "features" and "administration" databases 35, 33, respectively, with calling subscriber's E. 164 and provides processor 22 with calling features subscribed to by the calling party (Step 208). The central office 16*a* reads the called party digits to generate routing control signals for central office switching network 28 (Step 210). The processor 22 addresses the "features" and "administration" databases 35, 33 with the called party's E. 164 and provides the processor 22 with the features subscribed to by the called party (Step 211). The processor 22 checks the called party's IP network flag. (i.e., Has the IP network "flag" 31 been set ?) (Step 212). If the called party has logged onto the IP network, the IP network interface 27 at the central office 16*a* converts central office protocol into TCP/IP network protocol for switching network 28 and routes the call to the called party via the IP network 14 using called party's TCP/IP IP network address protocol (Step 216). If, on the other hand, the called party has not logged onto the IP network (i.e. the IP network "flag" 31 has not been set), the switching network 28 routes call to called party through PSTN 12 using called party's E. 164 (Step 214).

Considering now the case on the left of FIG. 2 where the central office 16*a* has been accessed through the IP network 14. Here, the calling party logs onto the IP network 14 using the local IP network Service Provider (ISP) 13 (Step 218). The client software is called up in the calling party's PC (Step 220). The client software includes: the central office's IP network TCP/IP address; the subscriber's E. 164; and the subscriber's personal identification number (PIN) (Step 220). The calling party enters called party digits on his/her PC (Step 222). The client software sends, via the PC, the subscriber's E. 164 to central office via the ISP 13 using central office TCP/IP IP network protocol (Step 224). The IP network interface 27 at the called central office 16*a* converts the TCP/IP IP network protocol into central office protocol and sets "IP network flag" 31 to indicate to calling party has logged onto IP network 14 (Step 226). At this point, the central office 16*a* processes calls placed to it from the PSTN 12 or the IP network 14 in the same manner. Thus, the central office processor 22 addresses "features" and "administration" databases 35, 33, respectively, with calling subscriber's E. 164 and provides processor 22 with calling features subscribed to by the calling party (Step 208). The central office 16*a* reads the called party digits to generate routing control signals for central office switching network 28. The processor 22 addresses the "features" and "administration" databases 35, 33 with the called party's E. 164 and provides the processor 22 with the features subscribed to by the called party (Step 211). The processor 22 checks the called party's IP network flag. (i.e., Has the IP network "flag" 31 been set ?) (Step 212). If the called party has logged onto the IP network, the IP network interface 27 at the central office 16*a* converts central office protocol into TCP/IP IP network protocol for switching network 28 and routes call to called party via the IP network 14 using called party's TCP/IP IP network address protocol (Step 216). If, on the other hand, the called party has not logged onto the IP network (i.e. the IP network "flag" 31 has not been set), the switching network 28 routes call to called party through PSTN 12 using called party's E. 164 (Step 214).

It is noted that the central office 16*a*, with its switching network 28, processor 22 and databases 35, 33 are, because of the IP network interface 27, available as an accessible adjunct to the all users of the IP network 14. Thus, a central office with the IP network interface can be configured as a worldwide Centrex, a cable-based IP provider can access the central office and route telephone calls or other data to subscribers of the PSTN or to others connected to the cable-based IP network.

Figure 3B:
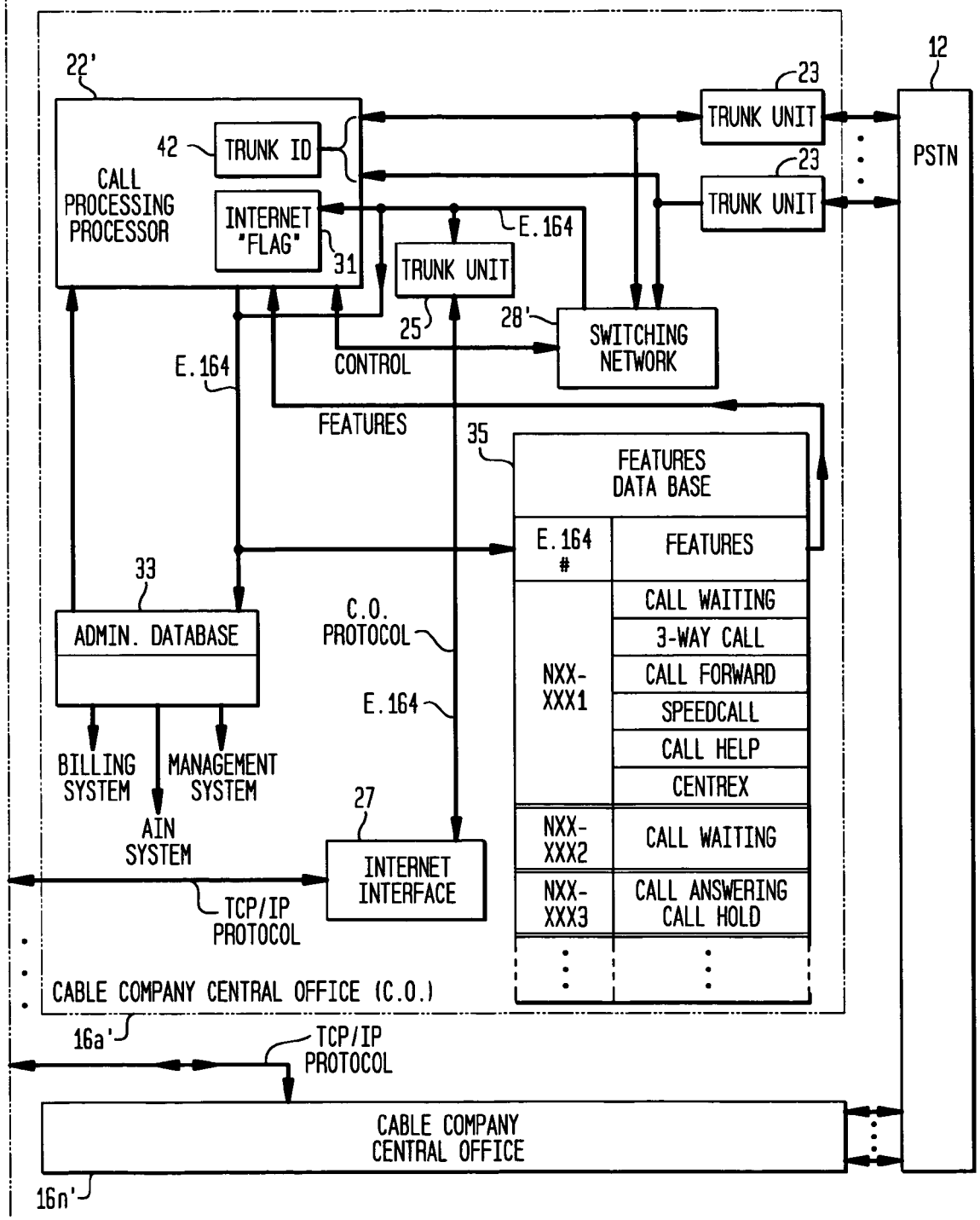
FIG. 3 is a block diagram of a telecommunication system according to the invention wherein a cable-based IP network is provided.

More particularly, referring to FIG. 3 a telecommunication system 10' is shown where a cable-based IP network 14' is coupled to cable modems 400 and cable company central offices 16*a*'–16*n*'. The cable modems 400 are coupled to subscriber personal computers (PCs) 402 and telephones 404, as indicated. The cable-based central offices 16*a*'–16*n*' are similar to the central offices 16*a*–16*n* described in connection with FIG. 1 and like elements are designated with the same numerical designation. Thus, the central offices 16*a*'–16*n*' are connected to the PSTN 12 by the trunk units 23, as indicated. The central offices 16*a*'–16*n*' each includes a call processor 22', trunk ID 406, administration database 33, features database 35, IP network interface 27 coupled to the cable-based IP network 14, trunk unit 25 and switching network 28'.

With the system 10', subscribers connected to the cable-based IP network 14' by the modems 400 are able to subscribe to the same telephone features available to subscribers of the central offices 16*a*–*n* (FIG. 1). Thus, referring to FIG. 4, a flow diagram shows the steps used by the telecommunication system of FIG. 3 in enabling a subscriber to calling features available by a cable company's central office of the system to have access to such calling features when such subscriber is accessing the central office through a cable based IP network. It is noted that the method does not use Steps 202, 204, or 206 described above in connection with FIG. 2, and here the "Internet Flag" 31 is always in a "set" condition.

Figure 5B:
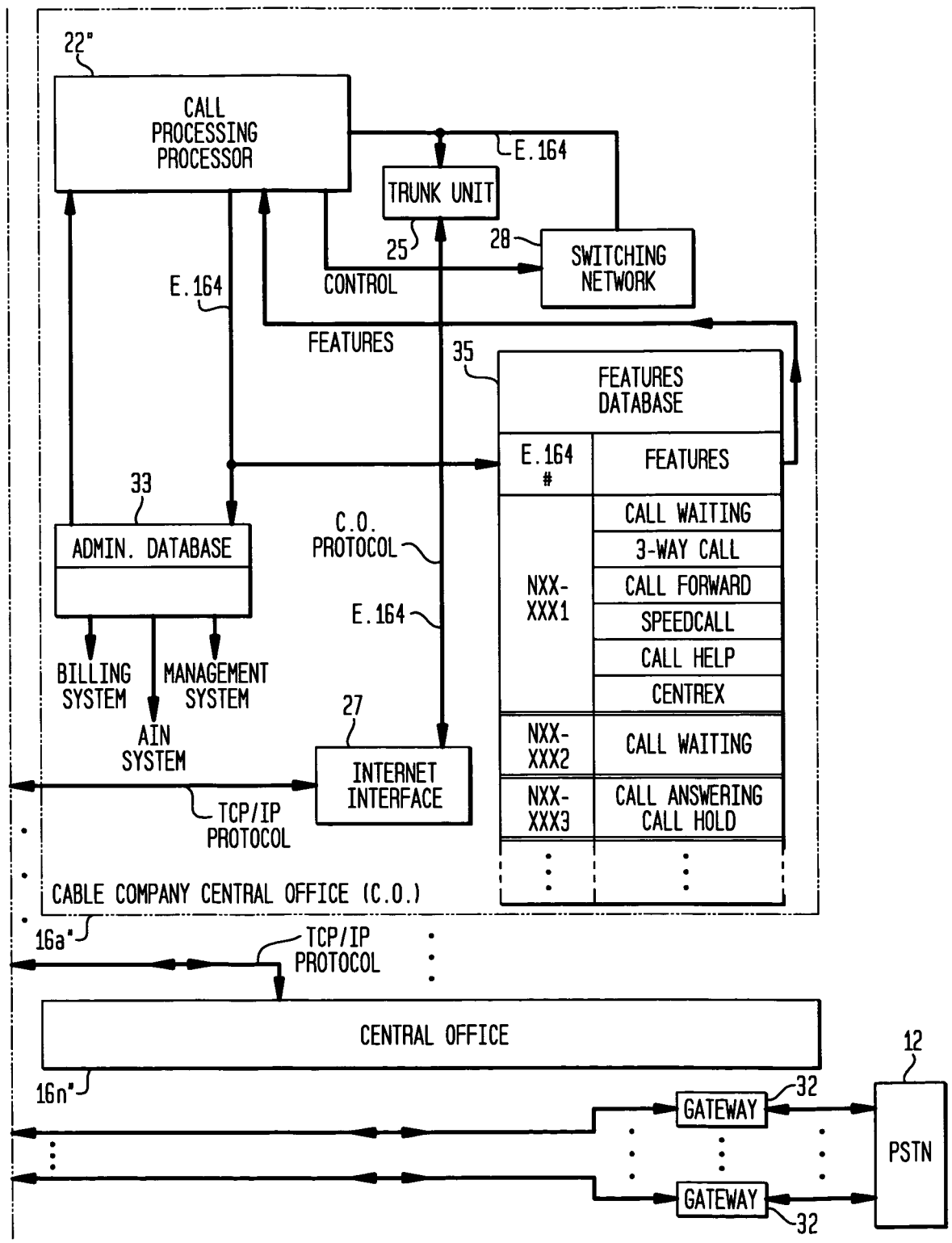
FIG. 5 is a block diagram of a telecommunication system according to an alternative embodiment of the invention.

Referring now to FIG. 5, a telecommunication system 10" is shown. Here, the IP network 14 is connected to the PSTN 12 through gateways 32, subscriber PCs through ISPs 13, and a router server 30, as shown. Each central office 16a"–16n" includes a processor 22" like that described in connection with FIG. 3. FIG. 6 is a flow diagram showing steps used by the telecommunication system of FIG. 5. Here, again, as with the system 10' described in connection with FIGS. 3 and 4, the "Internet Flag" 31 is always in a "set" condition. Here, because all calls originate and terminate for the central offices 16a'–16n' on the IP network 14, Steps 202–206 and Steps 212 and 214 (FIG. 1) are not used.

Here, each central office 16a"–16n" may be a owned by a global network carrier and used to deliver ubiquitous telephony feature services to worldwide subscribers of the IP network 14, for example, to all subscribers within a worldwide corporation.

Thus, the system 10" enabling members of a common group (i.e., a company) to have access to a common set of calling features in the features database available from the central office 16a". The system 10" processes signals received by the central office 16a", for example, from the members of the common group through the IP network 14 and makes such calling features available to the members.

Other embodiments are within the spirit and scope of the appended claims.

What is claimed is:

1. A telecommunication system adapted for use with a cable-based IP network, such system comprising:
    (a) a central office, comprising:
        (i) an IP network interface for converting between the central office protocol and the cable-based IP network, TCP/IP protocol;
        (ii) a database for storing a relationship between each one of a plurality of subscribers served by the cable-based central office and calling features subscribed to by at least one of the served subscribers;
        (iii) a processor coupled to the cable-based P network through the IP network interface, wherein the processor addresses the database using the central office protocol to provide a calling subscribers with subscribed calling features when the calling subscriber is routed to a called party through the switching network; and
        (iv) a switching network having at least one port thereof fed by trunk units and the IP network interface for routing calls between the ports selectively in accordance with switching signals provided by the processor in cable-based central office protocol.

2. A telecommunication system, comprising:
    (a) a central office, comprising:
        (i) an IP network interface for converting between a central office protocol and a cable-based IP network, TCP/IP protocol;
        (ii) a database for storing a relationship between each one of a plurality of subscribers served by the cable-based central office and calling features subscribed to by at least one of the served subscribers;
        (iii) a processor coupled to the cable-based IP network through the IP network interface, wherein the processor addresses the database using the central office protocol to provide a calling subscribers with subscribed calling features; and
        (iv) a switching network having at least one port thereof fed by a plurality of trunk units and the P network interface for routing calls between the ports selectively in accordance with a switching signal provided by the processor in cable-based central office protocol; and
    (b) a public service telephone coupled to the cable-based IP network.

3. A telecommunication system, comprising:
    (a) a central office, comprising:
        (i) an IP network interface for converting between a central office protocol and an IP network, TCP/IP protocol;
        (ii) a database for storing a relationship between each one of a plurality of subscribers served by the central office and calling features subscribed to by at least one of the served subscribers; and
        (iii) a processor coupled to the IP network through the IP network interface, wherein the processor addresses the database using the central office protocol to provide at least one of the served subscribers with subscribed calling features; and
    (a) a public service telephone network coupled to the IP network.

4. The telecommunication system in claim 3, further comprising:
    A router server for converting between a directory number and a TCP/IP address.

5. The telecommunication system in claim 3, wherein the IP network is a cable-based IP network.

6. The telecommunication system in claim 3, wherein the IP network is a Central Exchange network.

7. The telecommunication system in claim 3 wherein the subscriber is a called party.

8. The telecommunication system in claim 3 wherein the subscriber is a calling party.

9. The telecommunication system in claim 3 wherein the system provides a telephony feature service to the subscribers of the IP network.

10. The telecommunication system in claim 9 wherein the subscribers are within a worldwide business entity.

11. A telecommunication system adapted for use with a cable-based IP network, comprising:
    a cable company central office, comprising:
        (i) an IP network interface for converting between a central office protocol and a cable-based IP network, TCP/IP protocol;
        (ii) a processor being coupled to the cable-based IP network through the IP network interface;
        (iii) a switching network having ports thereof fed by trunk units and the IP network interface for routing calls between the ports selectively in accordance with switching signals provided by the processor in cable-based central office protocol;
        (iv) a database for storing a relationship between each one of a plurality of subscribers served by the cable-based central office and calling features subscribed to by such one of the served subscribers; and
        (v) wherein the processor addresses the database using the central office protocol to provide such calling subscriber with subscribed calling feature when the calling subscriber is routed to a called party through the switching network.

12. The system recited in claim 11 including a plurality of cable modems coupled to the cable-based IP network.

13. A telecommunication system adapted for use with a cable-based IP network, comprising:
   (a) a cable company central office, comprising:
      (i) an IP network interface for converting between a central office protocol and a cable-based IP network, TCP/IP protocol;
      (ii) a processor being coupled to the cable-based IP network interface;
      (iii) a switching network having ports thereof fed by trunk units and the IP network interface for routing calls between the ports selectively in accordance with switching signals provided by the processor in cable-based central office protocol;
      (iv) a database for storing a relationship between each one of a plurality of subscribers served by the cable-based central office and calling features subscribed to by such one of the served subscribers; and
      (v) wherein the processor addresses the database using the central office protocol to provide such calling subscriber with subscribed calling feature when the calling subscriber is routed to a called party through the switching network; and
   (b) a public service telephone network coupled to the cable-based IP network.

* * * * *